United States Patent Office 3,156,606
Patented Nov. 10, 1964

3,156,606
RUBBER COMPOSITION AND ARTICLE OF MANUFACTURE CONTAINING SAID COMPOSITION
Morris Blumberg, Newark, Del., assignor to Interchemical Corporation, New York, N.Y., a corporation of Ohio
No Drawing. Filed Apr. 4, 1960, Ser. No. 19,467
2 Claims. (Cl. 161—176)

This invention relates to an improved rubber composition and to a material containing a reinforcing layer of a cordlike synthetic fabric such as nylon bonded to a layer of said rubber composition. More particularly, the rubber composition of this invention contains trialkylene phosphoramide.

Because of the greater stresses to which rubber products containing fabric reinforcement are being subjected to, the rubber industry, particularly the automobile tire industry, is continually seeking sheet rubber materials containing synthetic fiber reinforcing elements wherein there is increased adhesion between the reinforcing element and the rubber.

Conventionally, prior to its incorporation with the rubber, the cordlike reinforcing element is impregnated or coated with an adhesive material. The reinforcing element is then bonded to a layer of the rubber.

It has now been found that the adhesion between the rubber and the reinforcing element can be increased considerably by incorporating a trialkylene phosphoramide, preferably tripropylene phosphoramide, into the rubber or the adhesive material. When the phosphoramide is incorporated into the rubber composition, it is preferred that the phosphoramide constitute about 6% of the total rubber composition by weight. The rubber is preferably synthetic rubber. The adhesive material is preferably a rubber latex, particularly a latex resulting from the polymerization of butadiene with vinyl pyridine or butadiene with styrene such as GR-S.

The following represents a formulation of a rubber composition utilizable in automobile tires, which composition has been modified to include tripropylene phosphoramide.

Rubber

| | Parts by weight |
|---|---|
| Synthetic rubber containing by weight 23.5 parts styrene and 66.5 parts of butadiene | 100 |
| Carbon black | 15 |
| Zinc oxide | 5 |
| Sulfur | 3 |
| Zinc diethyl dithiocarbonate | 0.15 |
| Mercapto benzothiazole | 1.5 |
| Tripropylene phosphoramide | 10 |
| Carbon black (fine thermal) | 30 |

The trialkylene phosphoramides utilized in this invention are also known in the art as trialkylene phosphoric triamides or N,N'N''-trialkylene phosphoric triamides which have the structural formula:

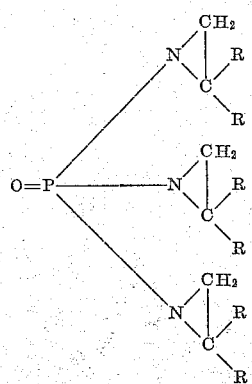

wherein R represents a member selected from the group of H, $CH_3$, $C_2H_5$. Accordingly, for example, tripropylene phosphoramide is also known as N,N'N''-tripropylene phosphoric triamide. A method suitable for making such compounds is described in U.S. Patent 2,606,902.

The following represents the formula of a typical latex adhesive which may be used in the practice of this invention.

Adhesive

| | Parts by weight |
|---|---|
| A rubber latex comprising 41% by weight of the polymerization product of butadiene with vinyl pyridine in an aqueous medium | 244 |
| Water | 249 |
| Formaldehyde (37% solution) | 16.2 |
| Resorcinol | 11 |
| NaOH | 0.3 |

Using conventional rubber compounding methods sheets of the above disclosed rubber formulation are formed.

An adhesive dip preparation having the above composition is prepared. A layer of nylon cord is dipped into the dip preparation in such a manner that 7% dip pick up occurs, which means that the adhesive adhering to the nylon increases the weight of the nylon by 7%. The adhesive carrying nylon cord layer is then bonded to the rubber sheet during the vulcanization of the rubber which is conducted at a platen pressure of 60 p.s.i. at 290° F. for 40 minutes.

A second sample of bonded nylon and rubber is prepared using exactly the same compositions and procedure except that the rubber composition contains no tripropylene phosphoramide. The material containing the propylene phosphoramide modified rubber displays increased bond strength over the material having the standard rubber.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:

1. A novel rubber composition comprising a major portion of a synthetic rubber comprising the polymerization product of styrene and butadiene and a minor portion of N,N'N''-tripropylene phosphoric triamide.

2. An article of manufacture comprising a layer of a rubber composition comprising a major portion of a synthetic rubber comprising the polymerization product of styrene and butadiene and a minor portion of N,N'N''-tripropylene phosphoric triamide and a layer of nylon cord impregnated with an adhesive material, said nylon cord layer being bonded by said adhesive material to said rubber layer.

References Cited in the file of this patent

UNITED STATES PATENTS

| | | |
|---|---|---|
| 2,653,886 | Gentle | Sept. 29, 1953 |
| 2,758,046 | Hill et al. | Aug. 7, 1956 |
| 2,949,386 | Cassel | Aug. 16, 1960 |
| 2,949,432 | Tarkington et al. | Aug. 16, 1960 |
| 2,952,652 | Beindorff et al. | Sept. 13, 1960 |